United States Patent
Koponen et al.

(10) Patent No.: US 6,366,659 B1
(45) Date of Patent: Apr. 2, 2002

(54) PROCEDURE FOR THE TRANSMISSION OF A SUBSCRIBER NUMBER

(75) Inventors: Teuvo Koponen, Oulu (FI); Juha Kokkonen, Düsseldorf (DE)

(73) Assignee: Nokia Corporation, Espoo (NL)

( * ) Notice: Subject to any disclaimer, the term of this patent is extended or adjusted under 35 U.S.C. 154(b) by 0 days.

(21) Appl. No.: 09/329,621

(22) Filed: Jun. 10, 1999

Related U.S. Application Data

(63) Continuation of application No. PCT/FI97/00729, filed on Nov. 26, 1997.

(30) Foreign Application Priority Data

Dec. 10, 1996 (FI) .................................................. 964941

(51) Int. Cl.⁷ ............................................... H04M 3/42
(52) U.S. Cl. ............................. 379/207.15; 379/207.14
(58) Field of Search .................. 379/127.01, 142.09, 379/207.14, 207.15

(56) References Cited

U.S. PATENT DOCUMENTS

| | | |
|---|---|---|
| 5,274,699 A | 12/1993 | Ranz |
| 5,278,894 A | 1/1994 | Shaw |
| 5,283,824 A | 2/1994 | Shaw |
| 5,521,969 A | 5/1996 | Paulus et al. |

FOREIGN PATENT DOCUMENTS

| | | |
|---|---|---|
| EP | 0 590 862 | 4/1994 |
| EP | 0 715 442 | 6/1996 |
| WO | WO 96/14702 | 5/1996 |

*Primary Examiner*—Creighton Smith
(74) *Attorney, Agent, or Firm*—Altera Law Group, LLC

(57) ABSTRACT

An ETSI standard contains a definition to the effect that the number to be transmitted to a subscriber line in a telephone exchange system to identify the other party of a call may be a number stored in the subscriber data for the other party of a number given from the other party's subscriber line. The invention relates to a procedure for the transmission of numbers to a subscriber line in accordance with the user's preferences. In other words, the invention allows the user to decide himself/herself whether the other party's number to be transmitted for presentation to the user's subscriber line is the number stored in the subscriber data for the other party, the number given from the other party's subscriber line, or both.

14 Claims, 1 Drawing Sheet

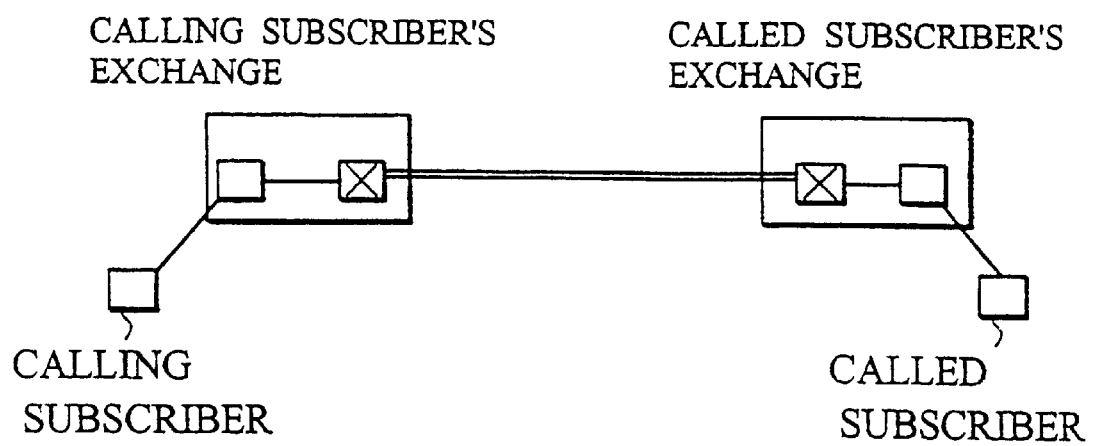

PROCEDURE FOR THE TRANSMISSION OF A SUBSCRIBER NUMBER

This application is a continuation of international patent No. PCT/FI97/00729, filed Nov. 26, 1997.

The present invention relates to a procedure for the transmission of a subscriber number as defined in the preamble of claim 1. In particular, the invention relates to a procedure for selecting the number or numbers to be transmitted to a subscriber line separately for each subscriber from among possible subscriber numbers received into the telephone exchange system.

In a digital telephone network, such as an ISDN network (ISDN, Integrated Services Digital Network), to allow identification of the parties to a call, it is possible to transmit to a subscriber line the subscriber number or several subscriber numbers of the other party between telephone exchange systems. Typically, the subscriber number transmitted to a subscriber line is the subscriber's directory number stored e.g. in conjunction with the subscriber data or subscriber line data in a data storage in the telephone exchange system. In a special case, one or the numbers to be transmitted may be a subscriber number provided from the subscriber line, which is not checked by the telephone exchange system. The subscriber holding a subscriber line can decide about the transmission of the subscriber number separately for each subscriber number or subscriber line.

Among previously known number display services allowing the transmission of more than one subscriber number are Calling Line Identification Presentation (CLIP) and Connected Line Presentation (COLP) Essential additional features associated with these services are Calling Line Identification Restriction (CLIR) and Connected Line Presentation Restriction (COLR), respectively.

For example, the service relating to the presentation of the calling number is defined in the ETSI (European Telecommunications and Standard Institute) standard of the ETS 300 092 series, which presents the requirements regarding the transmission of two numbers. The services are defined both in the basic ISDN subscription and in the ISDN system subscription.

The problem is that the terminal device has a limited capability of displaying numbers (typically a terminal device can display only one number). Moreover, users have different needs regarding presentation of numbers. Therefore, the telephone exchange system must be provided with a capability for selective subscriber number transmission. In addition, each subscriber must be able to control the transmission of subscriber numbers individually from the subscriber line. The object of the present invention is to eliminate the drawbacks described above. A specific object of the invention is to present a flexible and practical method that makes it easy to manage the subscriber number/numbers to be transmitted to the subscriber line of both the calling subscriber and the connected subscriber.

As for the features characteristic of the present invention, reference is made to the claims.

In the procedure of the invention, which is used in a telephone exchange system that may be e.g. an ISDN network comprising a number of telephone exchanges and the connections between them, a subscriber number is transmitted to a subscriber line involved in a call. A call can be set up between two subscriber lines or among several subscriber lines, in which case the call is a so-called conference call. Defined in the telephone exchange system are a number of subscribers together with the relevant subscriber data and a call is set up by means of terminal devices between subscriber lines, i.e. between the calling line and the called line. The called subscriber may also have activated a call transfer function, in which case the call will be connected between the calling subscriber line and the subscriber line assigned as receiver of transferred calls. The subscriber data comprise at least a subscriber number identifying the subscriber. The subscriber data are preferably stored in the telephone exchange system.

According to the invention, the stored subscriber data include information as to which number is to be transmitted to the subscriber line, i.e. data indicating whether the number to be transmitted to the subscriber line as the subscriber number of the other party of the call should be the subscriber number stored in the telephone exchange system, an unchecked subscriber number given by the subscriber, or both of these. Further, the procedure of the invention includes determining from the subscriber data which one or which ones of the subscriber numbers identifying the other party is to be transmitted to the subscriber line.

As compared with prior art, the present invention has the advantage that the procedure of the invention allows the subscriber to decide him/herself which one or which ones of the available subscriber numbers in his/her terminal device is/are to be presented as the subscriber number of the other party. In addition, in a telephone exchange system permitting the transmission of several subscriber numbers to a subscriber line, the invention also makes it possible to use a terminal device that is only capable of displaying one subscriber number, without contradiction regarding the number to be presented.

In a preferred embodiment, the number transmitted to the calling subscriber line as the other party's subscriber number is a subscriber number given by the other party, the other party's subscriber number stored in the subscriber data, or both. Further, the subscriber number of the calling subscriber line transmitted to the called subscriber line is a subscriber number given from the calling subscriber line, a subscriber number stored in the telephone exchange system, or both.

In a preferred embodiment, the procedure includes determining from the subscriber data during call setup or possibly at some other stage whether inhibition of number display has been activated for the subscriber line, in which case, if inhibition has been activated, no subscriber number is transmitted to the subscriber line. However, in certain special cases a situation may arise where the subscriber number is transmitted regardless of inhibition.

The information to be stored in the subscriber data regarding the number to be transmitted to the subscriber line can be controlled by means of MML (Man Machine Language) commands given in the telephone exchange system or the subscriber can give commands via his/her terminal device to update his/her subscriber data.

Moreover, in a Preferred embodiment, the transmission of the subscriber number of the calling and/or called subscriber line to the other party's subscriber line can be disabled. In this case, the subscriber data includes information indicating that the subscriber number of the subscriber line is not to be transmitted to the other party's subscriber line. Further, based on active inhibition present in the subscriber data, the other party's telephone exchange is notified that the subscriber number is not to be presented. The inhibition can be set separately for each call or for all calls of the subscriber line.

In the following, the invention will be described by the aid of a few examples of its preferred embodiments by referring to the attached drawing, which is a diagram representing a telephone exchange system according to the invention, comprising a calling subscriber's exchange and a called subscriber's exchange connected to it, as well as a calling subscriber's terminal device and a called subscriber's terminal device. Stored in the exchanges of both subscribers are the corresponding subscriber data. A telephone exchange system like this and its operation are obvious to the skilled person and are known in themselves and will therefore not be described here in detail. The examples are presented in an ISDN system, which allows the use of CLIP and COLP auxiliary services and the respective CLIR and COLR auxiliary services associated with them.

In a basic ISDN subscriber line, selective number display works in conjunction with COLP auxiliary service as follows. When a subscriber holding an ISDN line sets up an outgoing call, it can be established from the subscriber data for the calling subscriber that the subscriber has an active COLP auxiliary service. Based on this, information indicating that the calling subscriber has requested the number of the called subscriber is transmitted to the exchange of the subscriber line of the called user or called subscriber or, as mentioned above, to the exchange of the subscriber line to which the call has been transferred. After this, call setup proceeds in the normal way until a called subscriber response signal is received, whereupon the connected subscriber line can include its own subscriber number and possibly its sub-address too in the message to be transmitted to the calling subscriber line. In this situation, in a special case, the called user's telephone exchange system does not check the number provided from the subscriber line but transmits it as well as the subscriber's directory number stored in the telephone exchange system data to the calling subscriber's telephone exchange system. The calling subscriber's telephone exchange contains data defining which subscriber number(s) is/are to be transmitted to the calling subscriber line. As for the subscriber number provided by the connected subscriber, the action is as follows. A check is made to determine whether a subscriber number for the connected subscriber is obtained from the connected subscriber, and if one is obtained, then it is checked whether subscriber number display is allowed. If subscriber number display is allowed, then the subscriber number is displayed. If an override category has been defined for the calling subscriber, then the subscriber number provided by the network is also always transmitted to the calling subscriber line regardless of the settings regarding subscriber number display defined in the subscriber data for the subscriber concerned. Override category may be active e.g. in a subscriber line used by authorities.

The subscriber number provided by the connected subscriber and the subscriber number provided by the network are transmitted to the calling subscriber line in accordance with the definitions made for this line in the number transmission option. In other words, if both subscriber numbers are available and the subscriber data comprise a definition allowing the presentation of both subscriber numbers, then both subscriber numbers are displayed.

When a call is received at an ISDN line with a COLR auxiliary service and inhibition of display of connected subscriber number has been activated, then the data for the connected subscriber may not be presented to the calling subscriber. If the calling subscriber has requested subscriber number information about the connected user (COLP) and the called/connected subscriber has COLR auxiliary service for all calls, the information will not be presented, regardless of whether the response message given by the user contains information about number presentation or not. If the calling subscriber has requested number information (COLP) about the connected user and the called subscriber has a callspecific COLR auxiliary service in an active state, a check will be made to establish whether the called user has given a subscriber number in conjunction with the response message. If the user has included the subscriber number and information regarding display of the number in the response message, the number will be displayed if this is allowed on the basis of the response message. If the user has not included the subscriber number and information regarding display of the number in the response message, then the procedure will use a COLR default value obtained from the subscriber data.

In an ISDN line, selective number display works in conjunction with CLIP auxiliary service as follows. When an ISDN subscriber sets up an outgoing call, the calling subscriber can provide a subscriber number and a subaddress. In this situation, in a special case, the calling user's telephone exchange system does not check the number given from the subscriber line but transmits it along with the directory number stored in the telephone exchange system data to the called subscriber's telephone exchange system.

The calling subscriber's subscriber number or subscriber numbers, i.e. the number given by the user or the number stored in the telephone exchange system are passed on to the called subscriber's exchange whenever this is possible in the signaling. In the called subscriber's exchange, the subscriber data are checked to determine whether the called subscriber has an active CLIP function. If the function is not active, call setup will be continued in the normal manner if the function is active, a check is made to establish whether subscriber number display is allowed and whether the called subscriber has an active override category. If at least one of these two conditions is true, then the calling subscribes's subscriber number is transmitted to the called subscriber.

In the case of two subscriber numbers, the subscriber number provided by the calling subscriber and the subscriber number given by the network are transmitted in accordance with the definitions made in the number transmission option for the subscriber line concerned. If both numbers are available and the called subscriber's subscriber data indicate that both numbers are to be transmitted, then the subscriber number provided by the calling subscriber and the subscriber number provided by the network will be transmitted to the called subscriber's subscriber line. When a call is made to an ISDN line from a subscriber line with an active CLIR auxiliary service, it will be established during call setup that presentation of subscriber number is not allowed. In this case the subscriber number will only be presented in certain special circumstances.

The invention is not limited to the examples of its embodiments described above, but instead many variations are possible within the framework of the inventive idea defined by the claims.

What is claimed is:

1. A method for transmitting at least one subscriber number identifying a calling subscriber to a called subscriber in a digital telephone network comprising a calling subscriber terminal device, a called subscriber terminal device and a telephone exchange system comprising calling subscriber data, said subscriber number to be transmitted being selectable by said calling subscriber from among multiple pre-defined choices, said method comprising the steps of:

storing a first calling subscriber number in said calling subscriber data, storing calling subscriber number selection data in said calling subscriber data, said selection data comprising information about which calling subscriber number to select to be transmitted, giving a second calling subscriber number using said calling subscriber terminal device, transmitting either said first calling subscriber number, said second calling subscriber number or both to said called subscriber terminal device based on said calling subscriber number selection data.

2. The method as defined in claim 1, wherein said calling subscriber data further comprises inhibition data for determining whether inhibition of subscriber number display has been activated for the calling subscriber, in which case, if said inhibition has been activated, not transmitting any calling subscriber number to said called subscriber terminal device.

3. The method as defined in claim 1, wherein said digital telephone network is an ISDN network.

4. The method as defined in claim 1, wherein said calling subscriber number selection data is stored in said calling subscriber data using MML commands.

5. The method as defined in claim 1, wherein said calling subscriber number selection data is stored in said calling subscriber data using control commands given via said calling subscriber terminal device.

6. The method as defined in claim 1, wherein said transmitting said selected calling subscriber number is disabled on a per-call-basis.

7. The method as defined in claim 1, wherein said transmitting said selected calling subscriber number is disabled for all calls.

8. A method for transmitting at least one subscriber number identifying a called subscriber to a calling subscriber in a digital telephone network comprising a calling subscriber terminal device, a called subscriber terminal device and a telephone exchange system comprising called subscriber data, said subscriber number to be transmitted being selectable by said called subscriber from among multiple pre-defined choices, said method comprising the steps of:

storing a first called subscriber number in said called subscriber data, storing called subscriber number selection data in said called subscriber data, said selection data comprising information about which called subscriber number to select to be transmitted, giving a second called subscriber number using said called subscriber terminal device, transmitting either said first called subscriber number, said second called subscriber number or both to said calling subscriber terminal device based on said called subscriber number selection data.

9. The method as defined in claim 8, wherein said called subscriber data further comprises inhibition data for determining whether inhibition of subscriber number display has been activated for the called subscriber, in which case, if said inhibition has been activated, not transmitting any called subscriber number to said calling subscriber terminal device.

10. The method as defined in claim 8, wherein said digital telephone network is an ISDN network.

11. The method as defined in claim 8, wherein said called subscriber number selection data is stored in said called subscriber data using MML commands.

12. The method as defined in claim 8, wherein said called subscriber number selection data is stored in said called subscriber data using control commands given via said called subscriber terminal device.

13. The method as defined in claim 8, wherein said transmitting said selected called subscriber number is disabled on a per-call-basis.

14. The method as defined in claim 8, wherein said transmitting said selected called subscriber number is disabled for all calls.

* * * * *